US012039213B2

(12) United States Patent
Yoshida et al.

(10) Patent No.: US 12,039,213 B2
(45) Date of Patent: Jul. 16, 2024

(54) PRINT CONTROL APPARATUS TO CHANGE A NUMBER OR A SPECIFICATION OF VIRTUAL DATA CONVERSION SERVERS

(71) Applicant: SEIKO EPSON CORPORATION, Tokyo (JP)

(72) Inventors: Takumi Yoshida, Hara-Mura (JP); Masayuki Kobayashi, Fujimi-Machi (JP); Yukie Yamazaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/188,809

(22) Filed: Mar. 23, 2023

(65) Prior Publication Data

US 2023/0305774 A1    Sep. 28, 2023

(30) Foreign Application Priority Data

Mar. 25, 2022   (JP) ................. 2022-049459

(51) Int. Cl.
*G06F 3/12*     (2006.01)
(52) U.S. Cl.
CPC .......... *G06F 3/1247* (2013.01); *G06F 3/1205* (2013.01); *G06F 3/126* (2013.01); *G06F 3/1288* (2013.01)
(58) Field of Classification Search
None
See application file for complete search history.

(56) References Cited

U.S. PATENT DOCUMENTS

| | | | | |
|---|---|---|---|---|
| 2003/0197892 A1* | 10/2003 | Fukuoh | ................. | G06F 3/1205 358/1.15 |
| 2007/0027990 A1* | 2/2007 | Nakaoka | ............... | G06F 3/1255 709/226 |
| 2013/0250349 A1* | 9/2013 | Nakamura | ........... | G06F 3/1288 358/1.15 |
| 2014/0063543 A1 | 3/2014 | Nozawa | | |
| 2018/0067701 A1* | 3/2018 | Shirai | ................ | G06K 15/1848 |
| 2019/0042170 A1* | 2/2019 | Yamada | ................ | G06F 3/1259 |
| 2019/0243584 A1* | 8/2019 | Yashiro | ................. | G06F 3/1288 |
| 2021/0263689 A1* | 8/2021 | Albers | .................. | G06F 3/1248 |
| 2023/0138709 A1* | 5/2023 | Chen | ..................... | G06F 3/1285 358/1.15 |

FOREIGN PATENT DOCUMENTS

JP            2014049004 A      3/2014

* cited by examiner

*Primary Examiner* — Dung D Tran
(74) *Attorney, Agent, or Firm* — Pramod Chintalapoodi

(57) ABSTRACT

A print control apparatus includes a modification control section configured to change, in accordance with a given number relating to a print request issued by a terminal device, the number or a specification of one or more virtual data conversion servers that convert data of a print job based on the print request into data suitable for the printing apparatus, and an allocation control section configured to allocate the print job to any one of the changed one or more data conversion servers.

11 Claims, 7 Drawing Sheets

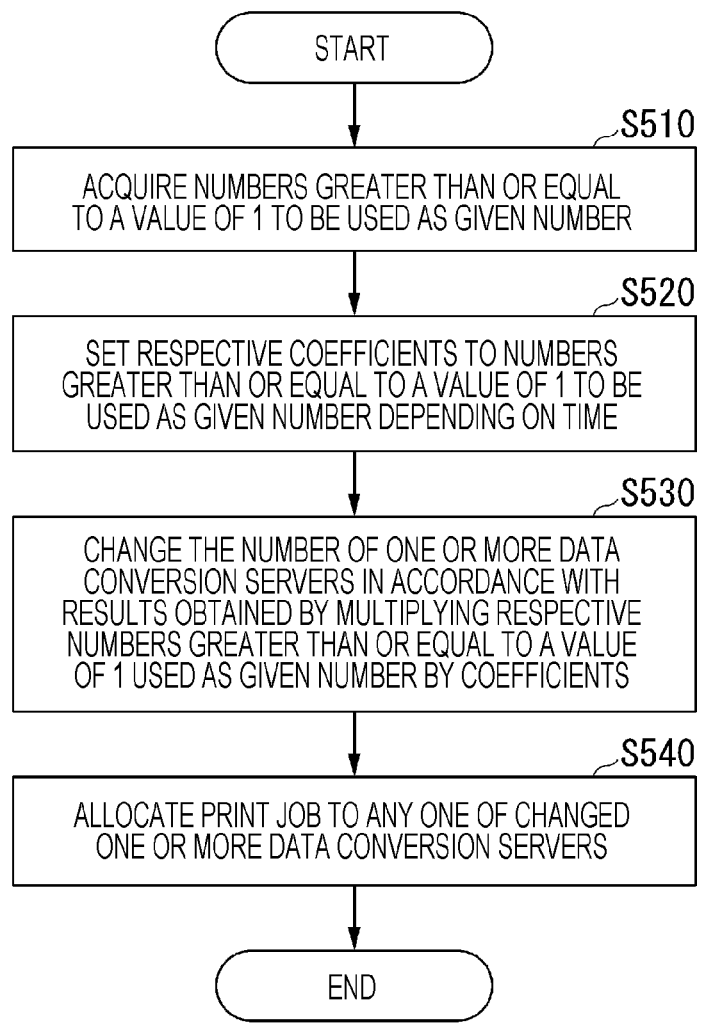

PRINT CONTROL APPARATUS TO CHANGE A NUMBER OR A SPECIFICATION OF VIRTUAL DATA CONVERSION SERVERS

The present application is based on, and claims priority from JP Application Serial Number 2022-049459, filed Mar. 25, 2022, the disclosure of which is hereby incorporated by reference herein in its entirety.

BACKGROUND

1. Technical Field

The present disclosure relates to a print control apparatus, a printing system, and a non-transitory computer-readable medium storing a program.

2. Related Art

Printing systems with intuitive settings for coupling printers to a network as in, for example, JP-A-2014-49004 are known. In the printing system described in JP-A-2014-49004, a print control apparatus, a data conversion server that converts data of a print job into a data format printable by a printing apparatus, and printing apparatuses are coupled via a network.

In such a printing system described in JP-A-2014-49004, however, the number of data conversion servers is fixed, and thus the throughput may decrease when the amount of print job data is large, whereas, the throughput may become excessive when the amount of print job data is small.

SUMMARY

The present disclosure has been made to solve the problem described above, and an aspect of the present disclosure provides a print control apparatus that includes a modification control section configured to change, in accordance with a given number relating to a print request issued by a terminal device, the number or a specification of one or more virtual data conversion servers that convert data of a print job based on the print request into data suitable for the printing apparatus, and an allocation control section configured to allocate the print job to any one of the changed one or more data conversion servers.

According to another aspect of the disclosure, a printing system that includes the print control apparatus and the one or more data conversion servers is provided.

According to still another aspect of the disclosure, a non-transitory computer-readable storage medium storing a program is provided. The program includes a modification control step of changing, in accordance with a given number relating to a print request issued by a terminal device, the number or a specification of one or more virtual data conversion servers that convert data of a print job based on the print request into data suitable for the printing apparatus, and an allocation control step of allocating the print job to the changed one or more data conversion servers.

BRIEF DESCRIPTION OF THE DRAWINGS

FIG. 11 illustrates an example of an autoscaling process performed by a third print controller according to a third embodiment of the present disclosure.

DESCRIPTION OF EXEMPLARY EMBODIMENTS

Figure 1:
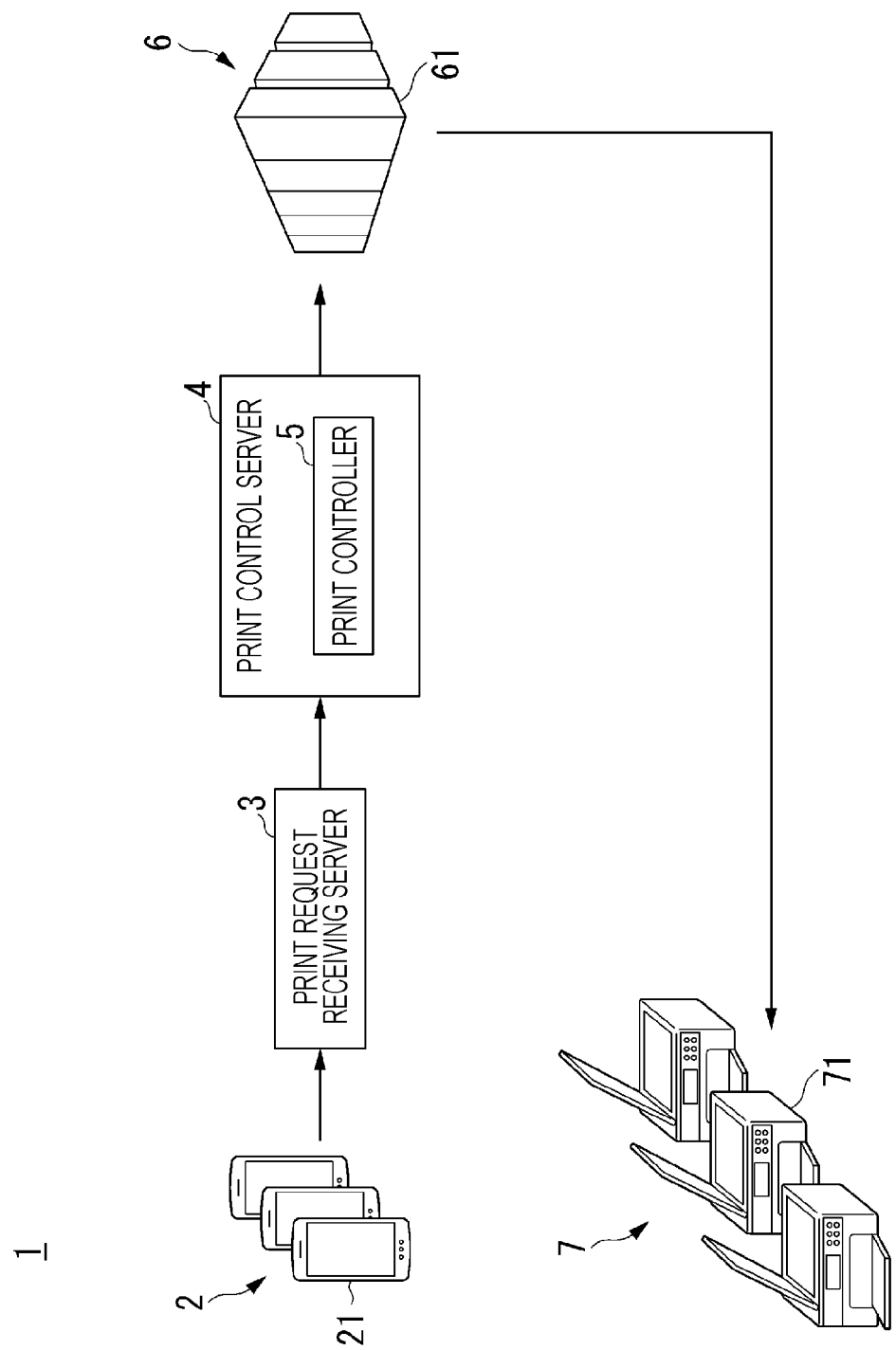
FIG. 1 illustrates an example of a printing system configuration according to a first embodiment of the present disclosure.

Hereinafter, embodiments of the present disclosure will be described with reference to the attached drawings. FIG. 1 illustrates an example of a configuration of a printing system 1 according to an embodiment. The printing system 1 includes a terminal device group 2, a print request receiving server 3, a print control server 4, a data conversion server group 6, and a printing apparatus group 7.

The data conversion server group 6 includes one or more virtual data conversion servers; that is, the data conversion server group 6 is a single server that functions as a plurality of servers by running a plurality of operating systems (OSs) on one server. The number of the one or more virtual data conversion servers included in the data conversion server group 6 can be changed. In the following description, the number of the one or more virtual data conversion servers included in the data conversion server group 6 may be referred to as a number of servers M1. The individual virtual data conversion servers included in the data conversion server group 6 have similar functions, and thus the virtual data conversion servers included in the data conversion server group 6 may be represented and described as a data conversion server 61 in the following description.

The terminal device group 2 includes one or more terminal devices. The individual one or more terminal devices included in the terminal device group 2 have similar functions, and thus the terminal devices included in the terminal device group 2 may be represented and described as a terminal device 21 in the following description.

The printing apparatus group 7 includes one or more printing apparatuses. The individual one or more printing apparatuses included in the printing apparatus group 7 have similar functions, and thus the printing apparatuses included in the printing apparatus group 7 may be represented and described as a printing apparatus 71 in the following description.

The terminal device group 2, the print request receiving server 3, the print control server 4, the data conversion server group 6, and the printing apparatus group 7 are coupled to each other via a wireless network for communication. The terminal device group 2 and the print request receiving server 3 communicate via, for example, a mobile communication network. The print request receiving server 3, the print control server 4, the data conversion server group 6, and the printing apparatus group 7 communicate via, for example, a wireless local area network (LAN).

The terminal device 21 issues a print request. The print request is an instruction that causes the printing apparatus 71 to perform printing. The print request includes information about a document or image to be printed, print settings information, and other information.

A document application and a printer driver are installed on the terminal device 21. The document application is a program that has functions of creating documents and images and functions of issuing print requests. The printer driver is a program for controlling print operations performed by the printing apparatus 71.

The terminal device 21 is, for example, a smart phone. The terminal device 21 may be a personal computer (PC).

The print request receiving server 3 is a server that receives print requests issued by the terminal device 21. The print request receiving server 3 generates a print job in accordance with a received print request. The print request receiving server 3 sends the generated print job to the print control server 4.

The print request receiving server 3 manages the number of print requests N1. The number of print requests N1 is the number of print requests issued by the terminal device 21 until a predetermined time has elapsed. The predetermined time is, for example, 10 minutes. The print request receiving server 3 updates the number of print requests N1 in real time.

The number of print requests N1 corresponds to a processing load expected to be subsequently applied to the data conversion server group 6. Accordingly, the number of virtual data conversion servers in the data conversion server group 6 can be increased in accordance with the number of print requests N1 before, for example, processing is actually performed by the data conversion server group 6. The printing system 1 can perform such an increasing process in accordance with the number of print requests N1 that varies with time.

The print control server 4 has a queue in which print jobs received from the print request receiving server 3 are placed. The print control server 4 sends queued print jobs one by one to the data conversion server group 6 in accordance with the operating conditions of the printing apparatus group 7.

Figure 2:
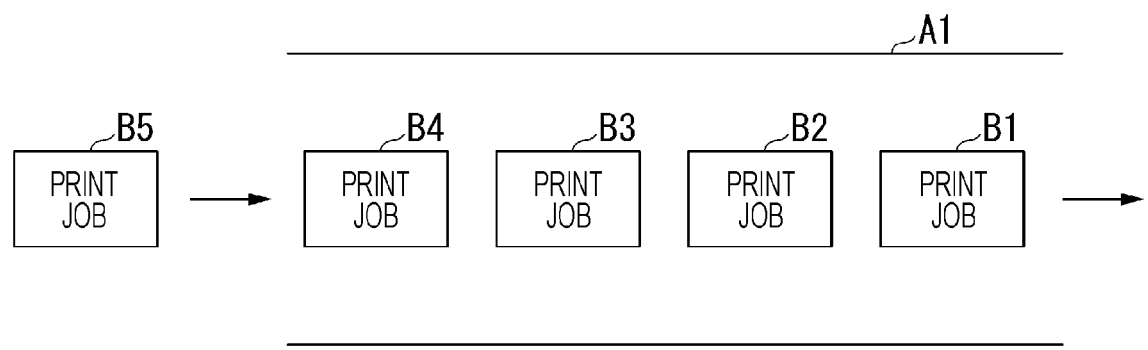
FIG. 2 is a schematic block diagram illustrating an example process of placing a print job in a queue according to a first embodiment of the present disclosure.

FIG. 2 illustrates a print job due to be placed in a queue A1 in the print control server 4. In FIG. 2, four print jobs, which are a first print job B1, a second print job B2, a third print job B3, and a four print job B4, are in the queue A1. The first print job B1, the second print job B2, the third print job B3, and the four print job B4 are sent to the data conversion server group 6 one by one in this order. A fifth print job B5 is a print job that is due to be placed in the queue A1 shortly. Note that in the following description, placing a new print job in the queue A1 may be referred to as adding a print job to the queue A1.

Returning to FIG. 1, the description of the print control server 4 is continued. The print control server 4 includes a print controller 5. The print controller 5 allocates a print job placed in a queue to a data conversion server in the data conversion server group 6. In addition, the print controller 5 performs autoscaling processing. Autoscaling is performed to change the number of virtual servers or a specification. In this embodiment, as an example, the print controller 5 changes the number of servers M1; more specifically, the print controller 5 changes the number of data conversion servers, which are virtual servers.

The print controller 5 is provided as, for example, a program in the print control server 4. More specifically, functional units of the print controller 5 are implemented by loading the program from a read-only memory (ROM) and executing the processing by using a central processing unit (CPU) in the print control server 4.

The data conversion server 61 converts data of a print job received from the print control server 4 into data suitable for the printing apparatus 71. The data conversion server 61 sends the converted data to the printing apparatus 71.

The printing apparatus 71 performs printing in accordance with the data converted by the data conversion server 61.

Although the example configuration of the printing system 1 illustrated in FIG. 1 includes the print request receiving server 3 and the print control server 4 as separate servers, the configuration is not limited to this example. In place of the print request receiving server 3 and the print control server 4, the printing system 1 may include a server having the function of the print request receiving server 3 and the function of the print control server 4 that are integrated into one server.

Figure 3:
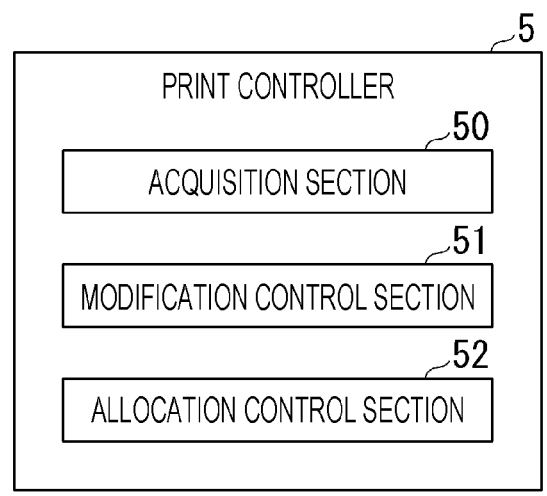
FIG. 3 illustrates an example of a functional configuration of a print controller according to a first embodiment of the present disclosure.

FIG. 3 illustrates an example functional configuration of the print controller 5 according to the embodiment. The print controller 5 includes an acquisition section 50, a modification control section 51, and an allocation control section 52.

The acquisition section 50 acquires a given number N0 relating to print requests issued by the terminal device 21. The given number N0 is, for example, the number of print requests N1 or the number of queued print jobs N2.

The modification control section 51 changes the number of servers M1 in accordance with the given number N0.

The allocation control section 52 allocates a print job to any one of the one or more virtual data conversion servers in the changed data conversion server group 6. The changed data conversion server group 6 refers to a data conversion server group 6 in which the number of servers M1 has been changed by the modification control section 51.

Next, print processing that is performed when printing is performed in the printing system 1 is described with reference to FIG. 4 to FIG. 7. Simultaneously with the print processing, autoscaling is performed by the print controller 5. The print processing and the autoscaling performed by the print controller 5 are repeatedly performed while the printing system 1 is in operation.

Figure 4:
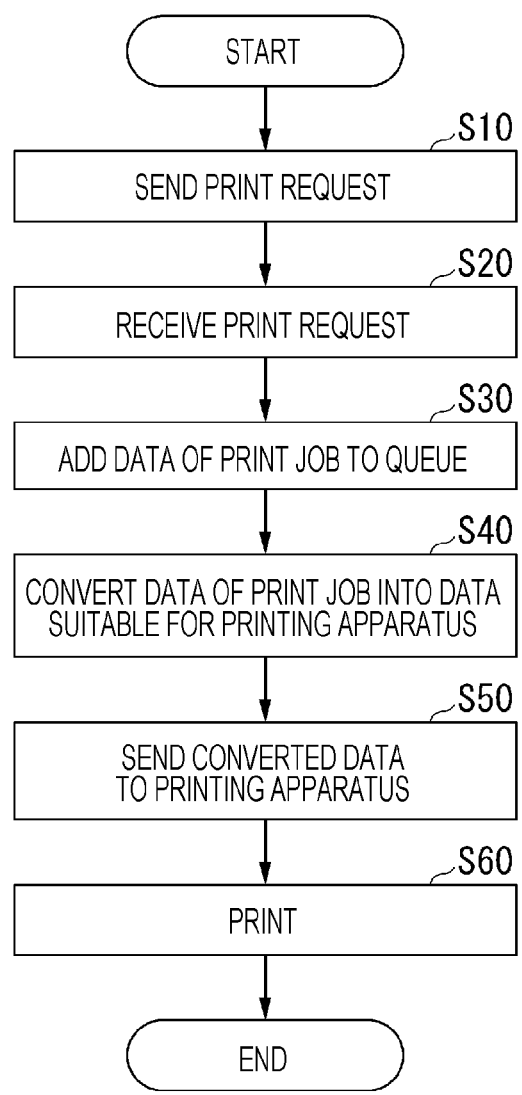
FIG. 4 illustrates an example of a print process according to a first embodiment of the present disclosure.

FIG. 4 illustrates an example print process according to the embodiment. Step S10: The terminal device 21 issues a print request. The user of the terminal device 21 performs an operation of issuing a print instruction on a menu of an application installed on the terminal device 21. In response to the terminal device 21 receiving the operation, the terminal device 21 sends a print request based on the print instruction content to the print request receiving server 3. After the process, the print request receiving server 3 performs processing in step S20.

Step S20: The print request receiving server 3 receives the print request issued by the terminal device 21. The print request receiving server 3 generates a print job in accordance with the received print request. The print request receiving server 3 sends the generated print job to the print control server 4. After the process, the print control server 4 performs processing in step S30.

Step S30: The print control server 4 adds the print job received from the print request receiving server 3 to a queue. Depending on the operating condition of the printing apparatus group 7, the print control server 4 sends print jobs in the queue one by one to the data conversion server group 6. After the process, the data conversion server 61 performs processing in step S40.

Step S40: The data conversion server 61 converts data of the print job received from the print control server 4 into data suitable for the printing apparatus 71. After the process, the data conversion server 61 performs processing in step S50.

Step S50: The data conversion server 61 sends the converted data to the printing apparatus 71. After the process, the printing apparatus 71 performs processing in step S60.

Step S60: The printing apparatus 71 performs printing in accordance with the data converted by the data conversion server 61. By performing the processing, the printing system 1 terminates the print processing.

Figure 5:
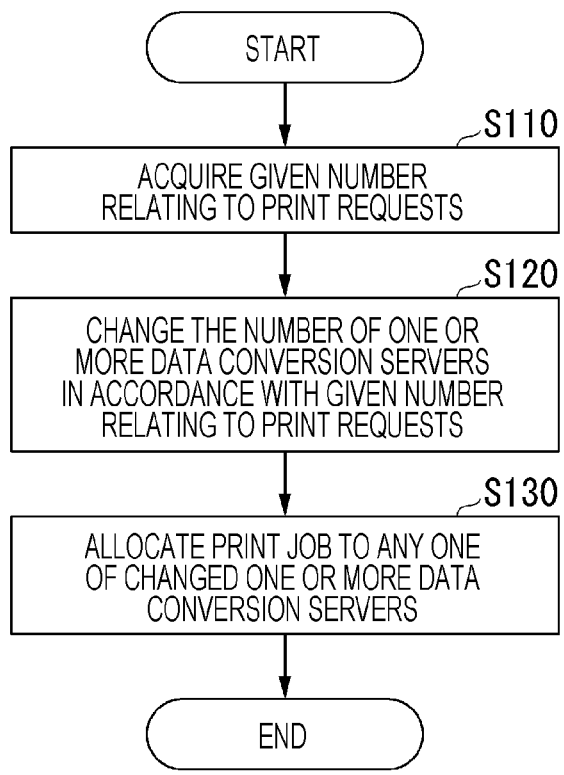
FIG. 5 illustrates an example of an autoscaling process performed by a print controller according to a first embodiment of the present disclosure.

FIG. 5 illustrates an example autoscaling process performed by the print controller 5 according to the embodiment. Step S110: The acquisition section 50 acquires a given number N0 relating to print requests issued by the terminal device 21. The acquisition section 50 acquires the given number N0 from the print request receiving server 3 or the print control server 4. After the process, the print controller 5 performs processing in step S120.

Step S120: The modification control section 51 changes the number of servers M1 in accordance with the acquired given number N0. For example, when the given number N0 is greater than or equal to a reference value, the modification control section 51 increases the number of servers M1, whereas, when the given number N0 is less than the reference value, the modification control section 51 reduces the number of servers M1. After the process, the print controller 5 performs processing in step S130.

Step S130: The allocation control section 52 allocates a print job to any one of the one or more virtual data conversion servers in the changed data conversion server group 6. By performing the processing, the print controller 5 terminates the autoscaling processing.

Figure 6:
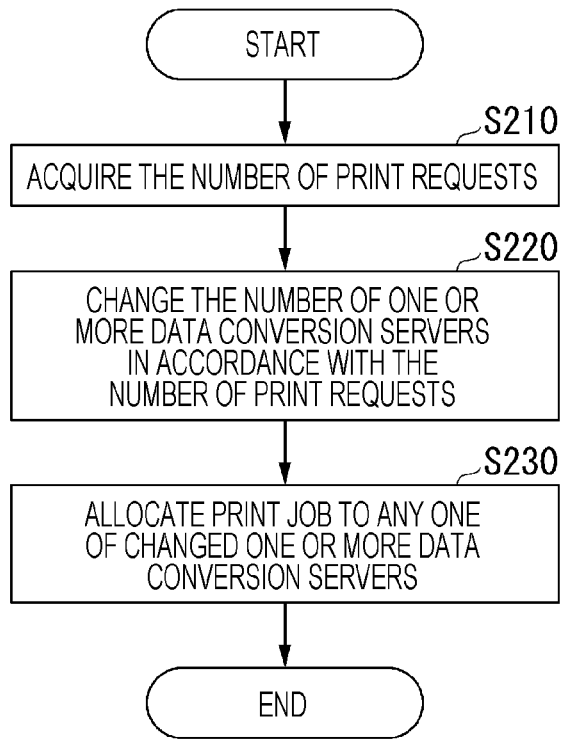
FIG. 6 illustrates an example of an autoscaling process performed when the number of print requests is used as a given number according to a first embodiment of the present disclosure.

Next, a case in which the number of print requests N1 is used as a given number N0 is described with reference to FIG. 6. FIG. 6 illustrates an example of an autoscaling process performed when the number of print requests N1 is used as a given number N0 according to the embodiment. It should be noted that the process in step S230 is similar to that in step S130 in FIG. 5, and thus its description is omitted.

Step S210: The acquisition section 50 acquires the number of print requests N1 from the print request receiving server 3. As described above, the number of print requests N1 is updated each time the print request receiving server 3 receives a print request or each time the print request receiving server 3 sends a print job to the print control server 4. The number of print requests N1 acquired from the print request receiving server 3 by the acquisition section 50 is the most recent number of print requests N1. After the process, the print controller 5 performs processing in step S220.

Step S220: The modification control section 51 changes the number of servers M1 in accordance with the acquired number of print requests N1. Accordingly, the modification control section 51 uses the number of print requests N1 as a given number N0. For example, when the number of print requests N1 is greater than or equal to a reference value, the modification control section 51 increases the number of servers M1, whereas, when the number of print requests N1 is less than the reference value, the modification control section 51 reduces the number of servers M1. After the process, the print controller 5 performs processing in step S230. By performing the processing, the print controller 5 terminates the autoscaling process performed when the number of print requests N1 is used as a given number N0.

Figure 7:
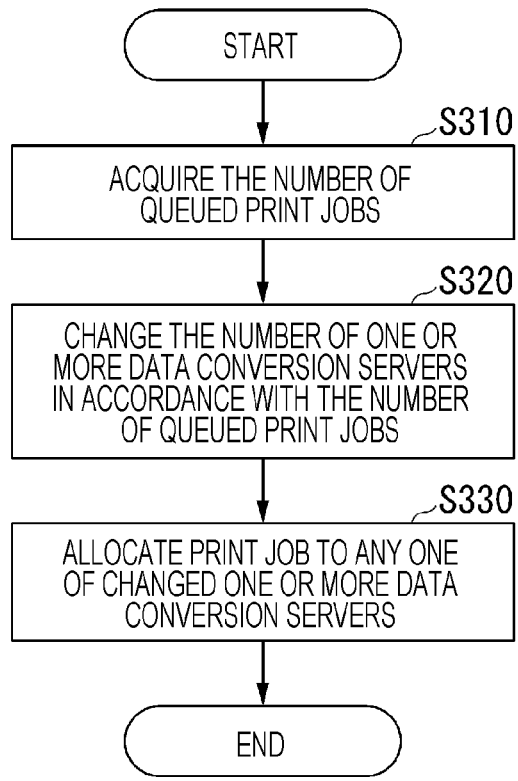
FIG. 7 illustrates an example of an autoscaling process performed when the number of queued print jobs is used as a given number according to a first embodiment of the present disclosure.

Next, a case in which the number of queued print jobs N2 is used as a given number N0 is described with reference to FIG. 7. FIG. 7 illustrates an example of an autoscaling process performed when the number of queued print jobs N2 is used as a given number N0 according to the embodiment. It should be noted that the process in step S330 is similar to that in step S130 in FIG. 5, and thus its description is omitted.

Step S310: The acquisition section 50 acquires the number of queued print jobs N2 from the print control server 4. The number of queued print jobs N2 is updated each time a print job is added to the queue or each time a print job in the queue is sent to the data conversion server group 6. The number of queued print jobs N2 acquired from the print control server 4 by the acquisition section 50 is the most recent number of queued print jobs N2. After the process, the print controller 5 performs processing in step S320.

Step S320: The modification control section 51 changes the number of servers M1 in accordance with the acquired number of queued print jobs N2. The modification control section 51 uses the number of queued print jobs N2 as a given number N0. For example, when the number of queued print jobs N2 is greater than or equal to a reference value, the modification control section 51 increases the number of servers M1, whereas, when the number of queued print jobs N2 is less than the reference value, the modification control section 51 reduces the number of servers M1. After the process, the print controller 5 performs processing in step S330. By performing the processing, the print controller 5 terminates the autoscaling process performed when the number of queued print jobs N2 is used as a given number N0.

Hereinafter, a second embodiment of the present disclosure will be described in detail with reference to the attached drawings. In the above-described first embodiment, the number of print requests N1 or the number of queued print jobs N2 is used as a given number N0; that is, a given number N0 is one number. In this embodiment, a result obtained by multiplying respective numbers greater than or equal to a value of 1 by coefficients is used as a given number N0.

A printing system according to the embodiment is referred to as a second printing system 1a, and a print controller according to the embodiment is referred to as a second print controller 5a. The second printing system 1a according to the embodiment differs from the printing system 1 according to the first embodiment in that the second printing system 1a includes the second print controller 5a. To components similar to those in the first embodiment described above, same reference numerals are given and descriptions of the similar components and operations may be omitted.

Figure 8:
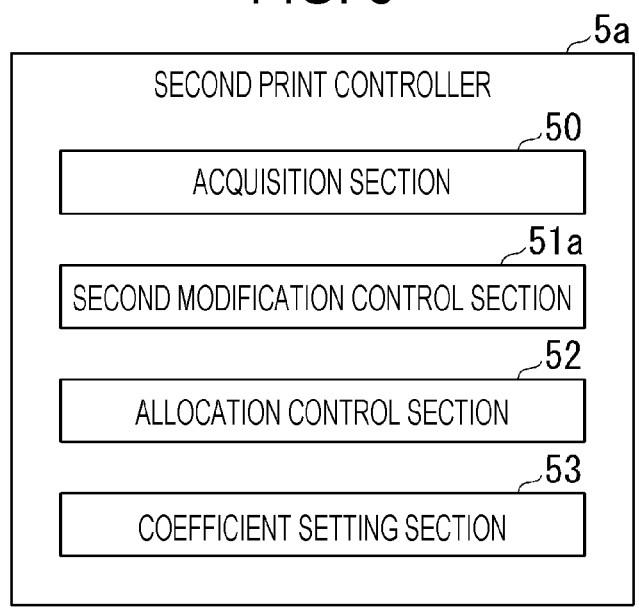
FIG. 8 illustrates an example of a configuration of a second print controller according to a second embodiment of the present disclosure.

FIG. 8 illustrates an example configuration of the second print controller 5a according to the embodiment. The second print controller 5a includes the acquisition section 50, a second modification control section 51a, the allocation control section 52, and a coefficient setting section 53. The second print controller 5a according to the embodiment differs from the print controller 5 according to the first embodiment in that the second print controller 5a includes the second modification control section 51a and the coefficient setting section 53. Here, the functions of the acquisition section 50 and the allocation control section 52 are similar to those in the first embodiment.

The coefficient setting section 53 sets respective coefficients C1 for multiplication to numbers greater than or equal to a value of 1 used as respective given numbers N0. For example, the coefficient setting section 53 sets respective coefficients C1 for multiplication to the number of print requests N1 and the number of queued print jobs N2.

The second modification control section 51a uses, as a given number N0, a result obtained by multiplying a number used as a given number N0 by a coefficient C1 set by the coefficient setting section 53. For example, the second modification control section 51a uses, as a given number N0, a result obtained by multiplying the number of print requests N1 by a coefficient C1 set by the coefficient setting section 53, as written in the equation (1):

$$\text{A given number} = \text{the number of print requests} \times \alpha \quad (1),$$

wherein "α" is a given constant. The "α" is an example coefficient C1 set by the coefficient setting section 53.

In another case, for example, the second modification control section 51a, as a given number N0, use a result obtained by multiplying the number of queued print jobs N2 by a coefficient C1 set by the coefficient setting section 53, as written in the equation (2):

$$\text{A given number} = \text{the number of queued print jobs} \times \beta \quad (2),$$

wherein "β" is a given constant. The "β" is an example coefficient C1 set by the coefficient setting section 53.

The second modification control section 51a may use, as a given number N0, both the number of print requests N1 and the number of queued print jobs N2. In such a case, for example, the second modification control section 51a uses, as a given number N0, the results obtained by multiplying the number of print requests N1 and the number of queued print jobs N2 by respective coefficients C1 set by the coefficient setting section 53, as written in the equation (3):

$$\text{A given number} = \text{the number of print requests} \times \alpha + \text{the number of queued print jobs} \times \beta \quad (3),$$

wherein "α" and "β" are respective given constants. The character "α" and the character "β" are example coefficients C1 set by the coefficient setting section 53.

For example, the coefficient setting section 53 sets the value of a coefficient C1 represented by the character "α" to 0.7 and sets the value of a coefficient C1 represented by the character "β" to 0.3 in the equation (3). Such settings correspond to modifying the number of servers M1 by the second modification control section 51a by placing more weight on the number of print requests N1 than the number of queued print jobs N2.

In still another case, for example, the coefficient setting section 53 sets the value of a coefficient C1 represented by the character "α" to 1.0 and sets the value of a coefficient C1 represented by the character "β" to 1.9 in the equation (3). Such settings correspond to modifying the number of servers M1 by the second modification control section 51a by placing more weight on the number of queued print jobs N2 than the number of print requests N1. At the time the number of queued print jobs N2 is acquired, the print jobs have already been in the queue, and thus such settings enable the second modification control section 51a to respond to crowded print jobs as quickly as possible by changing the number of servers M1.

Although the example in which the second modification control section 51a uses, as a given number N0, results obtained by multiplying the number of print requests N1 and the number of queued print jobs N2 by respective coefficients C1 set by the coefficient setting section 53 is described, this embodiment is not limited to this example. The second modification control section 51a may use, as a given number N0, both the number of print requests N1 and the number of queued print jobs N2 without multiplying a coefficient C1. For example, the second modification control section 51a, as a given number N0, use a result obtained by adding the number of print requests N1 and the number of queued print jobs N2.

Figure 9:
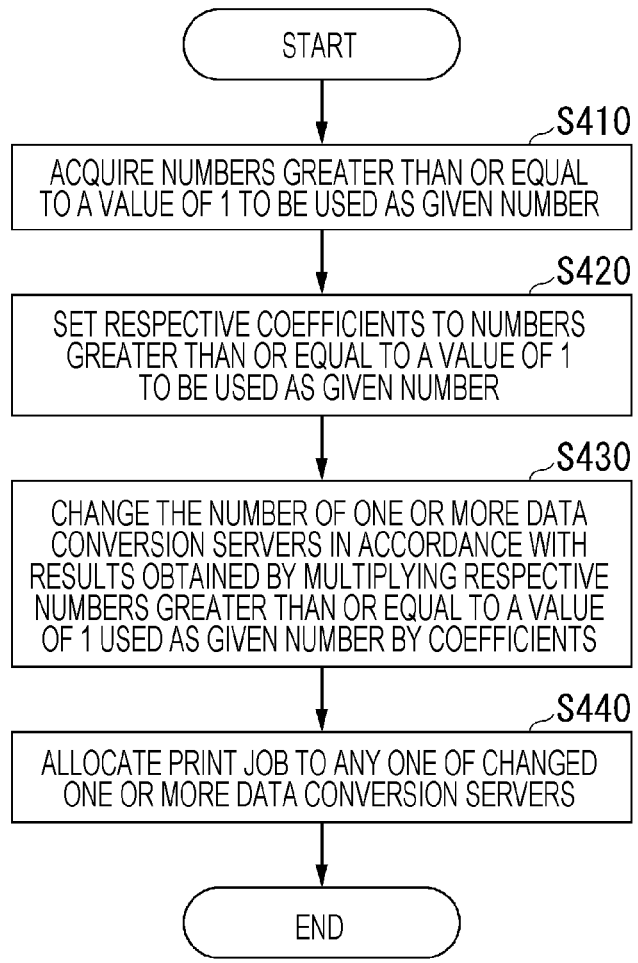
FIG. 9 illustrates an example autoscaling process performed by a second print controller according to a second embodiment of the present disclosure.

FIG. 9 illustrates an example autoscaling process performed by the second print controller 5a according to the embodiment. It should be noted that the process in step S440 is similar to that in step S130 in FIG. 5, and thus its description is omitted.

Step S410: The acquisition section 50 acquires numbers greater than or equal to a value of 1 that are used as a given number N0. The acquisition section 50 acquires the number of print requests N1 from the print request receiving server 3 as the number greater than or equal to a value of 1. The acquisition section 50 acquires the number of queued print jobs N2 from the print control server 4 as another number of the number greater than or equal to a value of 1. After the process, the second print controller 5a performs processing in step S420.

Step S420: The coefficient setting section 53 sets respective coefficients C1 for multiplication to the numbers greater than or equal to a value of 1 used as a given number N0. After the process, the second print controller 5a performs processing in step S430.

Step S430: The second modification control section 51a changes, as a given number N0, the number of servers M1 in accordance with the results obtained by multiplying respective numbers greater than or equal to a value of 1 used as the given number N0 by the coefficients C1 set by the coefficient setting section 53. The second modification control section 51a, for example, sets given constants as the coefficients C1, such as the character "α" and the character "β" in the above-described equation (3). After the process, the second print controller 5a performs processing in step S440.

Although such a coefficient C1 is a given constant in the second embodiment, the embodiment is not limited to this example. The coefficient C1 may be a function of a given parameter. Such a parameter is, for example, the number of print requests N1. Such a parameter may be the number of queued print jobs N2. The parameter may be a plurality of parameters. Such parameters are, for example, the number of print requests N1 and the number of queued print jobs N2. The function is, for example, a polynomial of given parameters. The polynomial is, for example, a quadratic polynomial. When a coefficient C1 is a function of a given parameter, the coefficient setting section 53 sets, for example, the coefficient C1 as the function of the number of print requests N1. By performing the processing, the second print controller 5a terminates the autoscaling processing.

Hereinafter, a third embodiment of the present disclosure will be described in detail with reference to the attached drawings. In the third embodiment, a case in which a coefficient C1 that is used to multiply a number greater than or equal to a value of 1 used as a given number N0 is set depending on a time is described.

A printing system according to the embodiment is referred to as a third printing system 1b, and a print controller according to the embodiment is referred to as a third print controller 5b. The third printing system 1b according to the embodiment differs from the second printing system 1a according to the second embodiment in that the third printing system $1b$ includes the third print controller $5b$. To components similar to those in the first embodiment and the second embodiment described above, same reference numerals are given and descriptions of the similar components and operations may be omitted.

Figure 10:
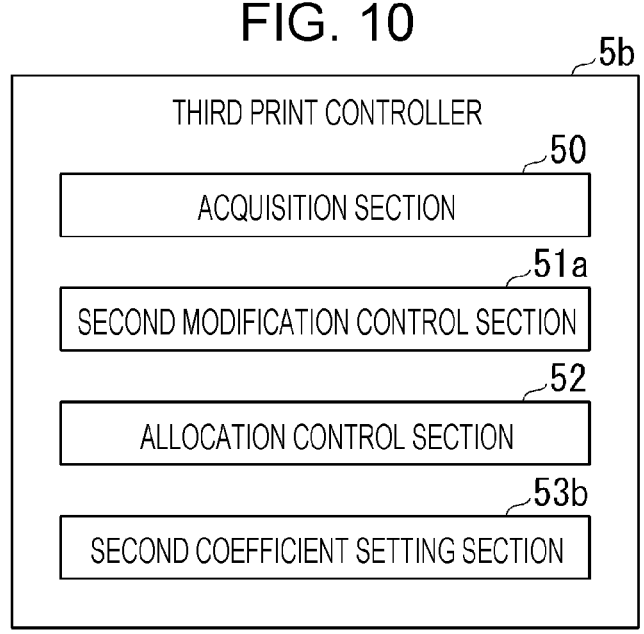
FIG. 10 illustrates an example a functional configuration of a third print controller according to a third embodiment of the present disclosure.

FIG. 10 illustrates an example functional configuration of the third print controller $5b$ according to the embodiment. The third print controller $5b$ includes the acquisition section 50, the second modification control section $51a$, the allocation control section 52, and a second coefficient setting section $53b$. The third print controller $5b$ according to the embodiment differs from the second print controller $5a$ according to the second embodiment in that the third print controller $5b$ includes the second coefficient setting section $53b$. Here, the functions of the acquisition section 50, the second modification control section $51a$, and the allocation control section 52 are similar to those in the second embodiment.

The second coefficient setting section $53b$ sets a coefficient C1 depending on a time. A time refers to, for example, a time period of a day. When a time is a time period of a day, the time is divided into, for example, day and night. In another example, a time refers to, for example, a day of the week. When a time is a day of the week, the time is, for example, a weekday, Saturday, or Sunday. In still another example, a time is a time of the year when a particular event occurs during the year. Example events includes, for example, a summer vacation, a year-end and New Year holiday, and the like.

FIG. 11 illustrates an example autoscaling process performed by the third print controller $5b$ according to the embodiment. The processes in step S510, step S530, and step S540 are similar to those in step S410, step S430, and step S440 in FIG. 9, and accordingly, their descriptions are omitted.

After step S510, the third print controller $5b$ performs processing in step S520. Step S520: The second coefficient setting section $53b$ sets a coefficient C1 depending on a time. The second coefficient setting section $53b$ acquires time information from a storage section. The time information refers to data of times associated with values set as coefficients C1. The third print controller $5b$ sets a coefficient C1 depending on a time in accordance with the time information. The storage section that stores the time information is provided in the third print controller $5b$, and the storage section is not illustrated in FIG. 10. After the process, the third print controller $5b$ performs processing in step S540.

Here, coefficients C1 that are set depending on a time as given numbers N0 when the number of print requests N1 and the number of queued print jobs N2 are used are described. For example, when a time is Saturday and Sunday, the second coefficient setting section $53b$ increases a coefficient C1 that multiplies the number of queued print jobs N2 to a coefficient greater than a coefficient C1 that multiplies the number of print requests N1. When a time is a weekday, the second coefficient setting section $53b$ increases a coefficient C1 that multiplies the number of print requests N1 to a coefficient greater than a coefficient C1 that multiplies the number of queued print jobs N2.

In another example, when a time is a summer vacation, the second coefficient setting section $53b$ increases a coefficient C1 that multiplies the number of print requests N1 to a coefficient greater than a coefficient C1 that multiplies the number of queued print jobs N2 such that the ratio of the coefficient C1 multiplying the number of print requests N1 to the coefficient C1 multiplying the number of queued print jobs N2 is greater than a given ratio. By performing the processing, the third print controller $5b$ terminates the autoscaling processing.

The modification control section 51 or the second modification control section $51a$ in the above-described embodiments may use, as a given number N0, a size of a print job generated in accordance with a print request or a size of a print job in a queue. In another case, the modification control section 51 and the second modification control section $51a$ may use, as given numbers N0, both a size of a print job generated in accordance with a print request and a size of a print job in a queue.

Although the modification control section 51 or the second modification control section $51a$ in the above-described embodiments change the number of one or more virtual data conversion servers in the data conversion server group 6 in accordance with a given number N0, these embodiments are not limited to this example. The modification control section 51 or the second modification control section $51a$ may change a specification of one or more virtual data conversion servers in the data conversion server group 6 in accordance with a given number N0.

When the modification control section 51 or the second modification control section $51a$ changes a specification of one or more virtual data conversion servers in the data conversion server group 6, the modification control section 51 or the second modification control section $51a$ may use, as a given number N0, a size of a print job generated in accordance with a print request, instead of the number of print requests N1. In another case, the modification control section 51 or the second modification control section $51a$ may use, as a given number N0, a size of a print job in a queue, instead of the number of queued print jobs N2.

The modification control section 51 or the second modification control section $51a$ may change both the number and a specification of one or more virtual data conversion servers in the data conversion server group 6 in accordance with a given number N0.

Although the print controller 5, the second print controller $5a$, or the third print controller $5b$ in the above-described embodiments is provided as a program in the print control server 4, the embodiments are not limited to this example. The print controller 5, the second print controller $5a$, or the third print controller $5b$ may be provided as a print control apparatus that is a server separated from the print control server 4.

As described above, the print control apparatus according to the above-described embodiments includes the modification control section and the allocation control section 52. The modification control section changes, in accordance with a given number N0 relating to a print request issued by a terminal device, the number or a specification of one or more virtual data conversion servers that convert data of a print job based on the print request into data suitable for the printing apparatus. The allocation control section 52 allocates the print job to the changed one or more data conversion servers.

In the above-described first embodiment, the print controller 5 is an example print control apparatus. The modification control section 51 is an example modification control section. In the above-described second embodiment, the second print controller $5a$ is an example print control apparatus. In the above-described third embodiment, the third print controller $5b$ is an example print control apparatus. In the above-described second embodiment and third embodiment, the second modification control section $51a$ is an example modification control section. In the above-described embodiments, any one of terminal devices in the terminal device group 2 is an example terminal device. In the above-described embodiments, the data conversion server group 6 is an example one or more data conversion servers.

This configuration enables the print control apparatus according to the embodiments to change the number or a specification of one or more virtual data conversion servers in accordance with a given number N0 relating to a print request, thereby suppressing the occurrence of excessive or insufficient throughput of the one or more data conversion servers. The print control apparatus according to the embodiments can reduce or control throughput decrease in the one or more data conversion servers when the amount of print job data is large, whereas the print control apparatus according to the embodiments can reduce or control excessive throughput in the one or more data conversion servers when the amount of print job data is small.

The number of uses of a printing service increases or decreases greatly depending on the day or night, what day of the week, or the like when the print service is provided via the Internet. To reduce the occurrence of a print service failure, typically, a known server infrastructure runs in a configuration to support the maximum number of uses. To ensure stable operation of a large printing service, it is important to decide whether to add servers in accordance with a usage status, requires monitoring of the trend of increased usage and taking actions such as planned infrastructure enhancements and addition of servers.

The print control apparatus according to the embodiments is configured to provide an optimal server infrastructure configuration in accordance with the number of uses. The number of uses refers to the number of print requests or the number of queued print jobs. Such a configuration enables the print control apparatus according to the embodiments to ensure a reduction in server usage fee and service usability.

In a known configuration, the utilization of a CPU in a server is monitored and servers are automatically added when the CPU utilization is greater than or equal to a threshold value, whereas the servers are automatically reduced when the CPU utilization is less than the threshold value. However, depending on programs running on the servers, the CPU utilization of some servers is 100% at the time the programs are executed, and in such a case, adding servers in accordance with the CPU utilization in the known technique may be inappropriate.

As described above, the print control apparatus according to the embodiments can change the number or a specification of servers in accordance with the number of uses such as the number of print requests or the number of print jobs in a queue. Accordingly, unlike the known technique that adds servers in accordance with CPU utilization, servers can be added before the server throughput becomes too high or too low. The print control apparatus according to the embodiments adds a server when the number of uses increases, thereby ensuring stable operation of the print service, whereas the print control apparatus according to the embodiments reduces a server when the number of uses decreases, thereby reducing the cost of operating the printing system.

The modification control section according to the embodiments uses the number of print requests as a given number N0. Such a configuration enables the print control apparatus according to the embodiments to change the number of data conversion servers in accordance with a utilization forecast; for example, the print control apparatus can change the number of data conversion servers at a timing before a print job is actually sent to the data conversion server. Here, the number of print requests corresponds to a forecast of the utilization of a data conversion server.

In the print control apparatus according to the embodiments, the modification control section uses the number of print jobs in a queue as a given number N0. Such a configuration enables the print control apparatus according to the embodiments to change the number of data conversion servers in accordance with a utilization result, and thus the print control apparatus can change the number of data conversion servers efficiently compared with a case in which a utilization forecast differs from a utilization result, for example, when a print request is canceled. Here, the number of print jobs in a queue corresponds to a utilization result.

In the print control apparatus according to the embodiments, the modification control section uses both the number of print requests and the number of print jobs in a queue as a given number N0. Such a configuration enables the print control apparatus according to the embodiments to change the number of data conversion servers in accordance with both a utilization forecast and a utilization result, and thus the print control apparatus can change the number of data conversion servers efficiently compared with a case in which only one of a utilization forecast and a utilization result is used to change the number of data conversion servers.

Each of the print control apparatus according to the above-described second embodiment and the third embodiment includes the coefficient setting section. Such a coefficient setting section sets respective coefficients C1 for multiplication to numbers greater than or equal to a value of 1 used as a given number N0. The modification control section uses, as a given number N0, results obtained by multiplying the numbers greater than or equal to a value of 1 by the respective coefficients C1 set by the coefficient setting section. Each of the coefficient setting section 53 and the second coefficient setting section 53b is an example coefficient setting section. Such a configuration enables the print control apparatus according to the above-described second embodiment or the third embodiment to change the number of data conversion servers in accordance with a result obtained by multiplying the numbers greater than or equal to a value of 1 used as a given number N0 by respective coefficients. Accordingly, the print control apparatus can efficiently change the number of data conversion servers with balanced numbers greater than or equal to a value of 1 that are used as a given number N0.

The coefficient setting section in the print control apparatus according to the above-described third embodiment sets a coefficient C1 depending on a time.

Such a configuration enables the print control apparatus according to the above-described third embodiment to set a coefficient C1 depending on a time. Accordingly, the print control apparatus can efficiently change the number of data conversion servers with balanced numbers greater than or equal to a value of 1 that are used as a given number N0.

The printing system according to the embodiments includes the print control apparatus according to the embodiments and one or more virtual data conversion servers. Each of the above-described printing system 1 according to the first embodiment, the second printing system 1a according to the second embodiment, and the third printing system 1b according to the third embodiment is an example printing system. This configuration enables the printing system according to the embodiments to change the number or a specification of one or more virtual data conversion servers in accordance with a given number N0 relating to a print request, thereby reducing or controlling throughput decrease in the one or more data conversion servers compared with a case in which the number or a specification of the one or more virtual data conversion servers is not changed.

Some parts of the print control apparatus according to the above-described embodiments, such as the modification control section and the allocation control section, may be implemented by a computer. In such a case, a program for implementing the control function may be stored on a non-transitory computer-readable storage medium, and the program stored on the non-transitory computer-readable storage medium may be loaded into a computer system and implemented. The "computer system" here refers to a computer system built into the print control apparatus and includes an operating (OS) and a hardware such as a peripheral device. The "non-transitory computer-readable storage medium" is a portable medium such as a flexible disk, a magneto-optical disk, a read-only memory (ROM), or a compact disk (CD)-ROM, or a storage device that is built into the computer system such as a hard disk. In addition, the "non-transitory computer-readable storage medium" may be a medium that can dynamically store a program for a short period of time, such as a communication line for transmitting a program via a network such as the Internet or via a communication line such as a telephone line, and in such a case, the "non-transitory computer-readable storage medium" may be a medium that can store a program for a certain period of time, such as a volatile memory in a server or in a computer system that is a client. The program may be a program that can implement some of the above-described functions, or a program that can implement the above-described functions in combination with a program that has already been stored in a computer system. All or some of the print control apparatus according to the above-described embodiments may be implemented as an integrated circuit, such as a large-scale integration (LSI). The functional blocks in the print control apparatus may be provided as individual processors, or all or some of the function blocks may be integrated as a processor. The method of implementing an integrated circuit is not limited to LSI, and an integrated circuit may be implemented as a dedicated circuit or a general-purpose processor. Integrated circuit produced by techniques for producing integrated circuits that replaces LSI with advances in technology may be used.

While the embodiments of the present disclosure have been described in detail with reference to the drawings, it is to be understood that the specific configurations are not limited to these configurations, and various design modifications may be made without departing from the scope of the disclosure.

What is claimed is:

1. A print control apparatus, comprising:
    at least one processor configured to:
        change, in accordance with a given number relating to a print request issued by a terminal device, a number and a specification of one or more virtual data conversion servers that convert first data of a print job based on the print request into second data suitable for a printing apparatus; and
        allocate the print job to any one of the changed one or more virtual data conversion servers.

2. The print control apparatus according to claim 1, wherein
    the at least one processor uses, as the given number, a number of print requests.

3. The print control apparatus according to claim 1, wherein
    the at least one processor uses, as the given number, a number of print jobs in a queue.

4. The print control apparatus according to claim 1, wherein
    the at least one processor uses, as the given number, both a number of print requests and a number of print jobs in a queue.

5. The print control apparatus according to claim 1, wherein the at least one processor is further configured to
    set respective coefficients for multiplication to numbers greater than or equal to a value of 1 used as the given number; and
    use, as the given number, results obtained by multiplying the numbers greater than or equal to the value of 1 by the respective coefficients.

6. The print control apparatus according to claim 5, wherein
    the at least one processor is further configured to set a coefficient depending on a time.

7. A printing system, comprising:
    the print control apparatus according to claim 1; and
    the one or more virtual data conversion servers.

8. A non-transitory computer-readable medium having stored thereon, computer-executable instructions which, when executed by a printing system, cause the printing system to execute operations, the operations comprising:
    changing, in accordance with a given number relating to a print request issued by a terminal device, a number and a specification of one or more virtual data conversion servers that convert first data of a print job based on the print request into second data suitable for a printing apparatus; and
    allocating the print job to any one of the changed one or more virtual data conversion servers.

9. A print control apparatus, comprising:
    at least one processor configured to:
        change, in accordance with a given number relating to a print request issued by a terminal device, one of a number or a specification of one or more virtual data conversion servers that convert first data of a print job based on the print request into second data suitable for a printing apparatus;
        allocate the print job to any one of the changed one or more virtual data conversion servers; and
        set respective coefficients for multiplication to numbers greater than or equal to a value of 1 used as the given number, wherein
            the at least one processor uses, as the given number, results obtained by multiplying the numbers greater than or equal to the value of 1 by the set respective coefficients.

10. A printing system, comprising:
    the print control apparatus according to claim 9; and
    the one or more virtual data conversion servers.

11. A non-transitory computer-readable medium having stored thereon, computer-executable instructions which, when executed by a printing system, cause the printing system to execute operations, the operations comprising:
    changing, in accordance with a given number relating to a print request issued by a terminal device, one of a number or a specification of one or more virtual data conversion servers that convert first data of a print job based on the print request into second data suitable for a printing apparatus;
    allocating the print job to any one of the changed one or more virtual data conversion servers; and setting respective coefficients for multiplication to numbers greater than or equal to a value of 1 used as the given number,
wherein results obtained by multiplying the numbers greater than or equal to the value of 1 by the set respective coefficients is used as the given number.

\* \* \* \* \*